United States Patent
Cardoso et al.

(10) Patent No.: US 11,568,319 B2
(45) Date of Patent: Jan. 31, 2023

(54) TECHNIQUES FOR DYNAMIC MACHINE LEARNING INTEGRATION

(71) Applicant: Hyland UK Operations Limited, Berkshire (GB)

(72) Inventors: Tiago Filipe Dias Cardoso, Brooklyn, NY (US); Pedro Miguel Dias Cardoso, Brooklyn, NY (US); Gethin Paul James, Brooklyn, NY (US)

(73) Assignee: Hyland UK Operations Limited, Berkshire (GB)

( * ) Notice: Subject to any disclaimer, the term of this patent is extended or adjusted under 35 U.S.C. 154(b) by 0 days.

(21) Appl. No.: 17/137,746

(22) Filed: Dec. 30, 2020

(65) Prior Publication Data

US 2022/0207418 A1    Jun. 30, 2022

(51) Int. Cl.
*G06N 20/00* (2019.01)
*G06F 8/60* (2018.01)
*G06F 16/908* (2019.01)

(52) U.S. Cl.
CPC ............... *G06N 20/00* (2019.01); *G06F 8/60* (2013.01); *G06F 16/908* (2019.01)

(58) Field of Classification Search
CPC ......... G06N 20/00; G06F 8/60; G06F 16/215; G06F 16/908
USPC .......................................................... 706/12
See application file for complete search history.

(56) References Cited

U.S. PATENT DOCUMENTS

| | | | |
|---|---|---|---|
| 9,135,559 B1 * | 9/2015 | Chan | G06N 5/022 |
| 10,366,053 B1 * | 7/2019 | Zheng | G06N 20/00 |
| 10,719,301 B1 * | 7/2020 | Dasgupta | G06K 9/6267 |
| 2006/0235715 A1 * | 10/2006 | Abrams | G06Q 40/04 705/1.1 |
| 2008/0004864 A1 * | 1/2008 | Gabrilovich | G06N 20/00 704/9 |
| 2012/0215727 A1 * | 8/2012 | Malik | G06N 5/00 706/12 |
| 2014/0108359 A1 * | 4/2014 | Banaei-Kashani | G06F 11/0763 707/692 |
| 2015/0213065 A1 * | 7/2015 | Sisk | G06F 16/353 707/692 |
| 2017/0308557 A1 * | 10/2017 | Cassidy | G06F 12/0253 |
| 2019/0180195 A1 * | 6/2019 | Terry | G06F 40/295 |
| 2020/0196110 A1 * | 6/2020 | Jakobsson | H04W 76/14 |
| 2020/0410386 A1 * | 12/2020 | Loving | G06K 9/6218 |
| 2021/0081720 A1 * | 3/2021 | Polleri | G06F 11/3452 |

* cited by examiner

*Primary Examiner* — James D. Rutten
(74) *Attorney, Agent, or Firm* — Eschweiler & Potashnik, LLC

(57) ABSTRACT

Various embodiments are generally directed to techniques for dynamically integrating ML functionality into computing systems, such as a content services platform (CSP), for instance. Many embodiments include ML integrated into a CSP and using production content as corpora (e.g., training and/or evaluation data). Some embodiments are particularly directed to generating and updating data for training and evaluating machine learning (ML) models, then making identified ML models available in various target environments. For example, embodiments may provide automatic, or semi-automatic, updating and deploying of ML models for making inferences, such as inferring labels for data in a content repository of a CSP.

20 Claims, 8 Drawing Sheets

TECHNIQUES FOR DYNAMIC MACHINE LEARNING INTEGRATION

BACKGROUND

Machine learning is the study of computer algorithms that improve automatically through experience. Typically, machine learning algorithms build a model based on sample data, referred to as training data, in order to make predictions or decisions without explicitly being programmed to do so. Machine learning may utilize specialized software and/or hardware components that require integration to operate in conjunction with nonmachine learning software and/or hardware. For example, data must be sourced and prepared to generate training data. In another example, after a machine learning model is produced based on training data, the model needs to be deployed and hosted before use for making predictions or decisions.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In one aspect, the present disclosure relates to an apparatus comprising a processor and a memory comprising instructions that when executed by the processor cause the processor to perform one or more of obtain source data from one or more data sources, the source data comprising a plurality of data items; produce training data based on the source data, wherein production of the training data includes removal of at least one of the plurality of data items from the source data based on one or more data metrics associated with a machine learning framework; provide the training data to the machine learning framework to generate a model version; receive the model version from the machine learning framework; deploy the model version to a target environment based on a status setting corresponding to the model version; and integrate a production repository associated with the model version to the target environment.

In some embodiments, the target environment includes a content services platform. In some such embodiments, the target environment includes a content repository of the content services platform. In various embodiments, the one or more data sources comprise at least a portion of the production repository. In many embodiments, the memory comprises instructions that when executed by the processor cause the processor to generate a log of activity associated with one or more of obtaining the source data from the one or more data sources, producing the training data based on the source data, providing the training data to the machine learning framework, receiving the model version from the machine learning framework, deploying the model version to the target environment based on the status setting corresponding to the model version, and integrating the production repository associated with the model version to the target. In several embodiments, each data item includes data and metadata corresponding to the data. In various embodiments, production of the training data includes transformation of at least one of the plurality of data items in the source data from a format incompatible with the machine learning framework into a format compatible with the machine learning framework. In one or more embodiments, the data metric comprises one or more of a file type, a file size threshold, a quality threshold, and a reliability indicator. In various embodiments, production of the training data includes normalizing the source data.

In another aspect, the present disclosure relates to at least one non-transitory computer-readable medium comprising a set of instructions that, in response to being executed by a processor circuit, cause the processor circuit to perform one or more of obtain source data from one or more data sources, the source data comprising a plurality of data items; produce training data based on the source data, wherein production of the training data includes removal of at least one of the plurality of data items from the source data based on one or more data metrics associated with a machine learning framework; provide the training data to the machine learning framework to generate a model version; receive the model version from the machine learning framework; deploy the model version to a target environment based on a status setting corresponding to the model version; and integrate a production repository associated with the model version to the target environment.

In various embodiments, the target environment includes a content services platform. In various such embodiments, the target environment includes a content repository of the content services platform. In many embodiments, the one or more data sources comprises at least a portion of a production repository. Some embodiments comprise instructions that, in response to being executed by the processor circuit cause the processor circuit to generate a log of activity associated with one or more of obtaining the source data from the one or more data sources, producing the training data based on the source data, providing the training data to the machine learning framework, receiving the model version from the machine learning framework, deploying the model version to the target environment based on the status setting corresponding to the model version, and integrating the production repository associated with the model version to the target. In one or more embodiments, each data item includes data and metadata corresponding to the data. In several embodiments, production of the training data includes transformation of at least one of the plurality of data items in the source data from a format incompatible with the machine learning framework into a format compatible with the machine learning framework.

In yet another aspect, the present disclosure relates to a computer-implemented method comprising one or more of obtaining source data from one or more data sources, the source data comprising a plurality of data items; producing training data based on the source data, wherein production of the training data includes removal of at least one of the plurality of data items from the source data based on one or more data metrics associated with a machine learning framework; providing the training data to the machine learning framework to generate a model version; receiving the model version from the machine learning framework; and deploying the model version to a target environment based on a status setting corresponding to the model version.

In some embodiment, the computer-implemented method includes integrating a production repository associated with the model version to the target environment. In various embodiments, production of the training data includes transforming at least one of the plurality of data items in the source data from a format incompatible with the machine learning framework into a format compatible with the machine learning framework. In many embodiments, the computer-implemented method includes generating a log of activity associated with one or more of obtaining the source data from the one or more data sources, producing the training data based on the source data, providing the training data to the machine learning framework, receiving the model version from the machine learning framework, deploying the model version to the target environment based on the status setting corresponding to the model version, and integrating the production repository associated with the model version to the target.

DETAILED DESCRIPTION

Various embodiments are generally directed to techniques for dynamically integrating ML functionality into computing systems, such as a content services platform (CSP), for instance. Many embodiments include ML integrated into a CSP and using production content as corpora (e.g., training and/or evaluation data). Some embodiments are particularly directed to generating and updating data for training and evaluating machine learning (ML) models, then making identified ML models available in various target environments. For example, embodiments may provide automatic, or semi-automatic, updating and deploying of ML models for making inferences, such as inferring labels for data in a content repository of a CSP. These and other embodiments are described and claimed.

Many challenges face machine learning integration. Developing an ML project or use case implementation with a content repository requires an overly complex and resource intensive amount of data engineering, infrastructure, and integration. For example, continually evolving data as well as frequently changing data sources necessitates frequent updates and changes to the process for obtaining and/or preparing updated content (e.g., training data). In another example, continually evolving target environments with dynamic operating parameters necessitates frequent updates and changes to the process for deploying, hosting, and/or applying ML models to data. In both examples, the updates and changes typically require evaluation by multiple experts that specialize in different aspects of ML (e.g., a team of data scientists with cross-functional groups to work together, understand each other and the dependencies). Further, more experts may be required to interpret and analyze predictions. This can make model/content integration unbearably resource intensive in terms of effort, cost, and time.

Adding more complexity, integrating a production repository to where a model is deployed can create various security, privacy, and data engineering concerns. For instance, integration could lead to the exposure of sensitive data. Adding still more complexity, failing to track historical configurations and settings complicates identifying, diagnosing, and/or repairing issues. For example, distinguishing data produced, or decisions made by ML models from human-generated data can be difficult or impossible without adequate auditing. These and other factors can make model/content integration more challenging than the ML development to create an ML model, and result in expensive, complex, and inefficient integration of ML. Such limitations can drastically reduce the functionality while increasing the need for manual input and expert guidance, contributing to lost economies of scale, missed insights, and inefficient systems, devices, and techniques with limited capabilities.

Various embodiments described hereby include an ML integrator to automatically source and transform all content (e.g., source data) into renditions (e.g., training data) ready for input into an ML framework. Many embodiments continuously send new or modified content to the applicable ML models. Models may be readily retrained or optimized (e.g., hyperparameter training) with the most recent content. Further, the new model versions can be governed in terms of active/inactive and target environments. Several embodiments include the ability to selectively publish models. For example, models may be published (e.g., deployed and hosted) with labels, being active and available to one or more target environments (e.g., corresponding environment instances). Multiple embodiments enable dynamic model generation and utilization, such as by training new model iterations with production content. One or more of these features can enable use cases for content that is very dynamic and models that have short lifespans, such as due to new categories and content is being added all the time.

Many embodiments automate and/or enable users to avoid issues with data engineering (e.g., manual transformations, cleaning data, continuous content extraction, transformation, and loading), training (e.g., model creation, update, and publishing), and model usage and integration with CSP content structures and metadata.

users with an intuitive interface system that enable users to derive value from ML by providing a uniform user experience with intuitive functionalities to implement the predictive power of ML models. The interface system may guide users through the operation and configuration of various aspects of the ML integrator including analysis, interpretation, and/or resolution of associated data, issues, and results. In another example, the interface system may allow a bulk action to be run on lists of documents (e.g., from search, folder, collection) that asks one or more ML models for predictions. In such examples, the results may be filled in depending on thresholds that are configurable via the interface system. In yet another example, each time a form is accessed to create or edit content, suggestions for the new content may automatically be provided from model predictions. Many embodiments allow bulk predictions to be applied in a safe way that enables the scalability of AI to be tapped into.

Several embodiments include an audit system that tracks operation of the ML integrator and/or components connected thereto. For example, the lifecycle, usage, and performance data of a model can be audited, logged, and made available for analysis. Further, automatic actions from prediction may be backtracked to a previous state. In another example, information, such as visual indications, may be provided to distinguish content generated by ML modes from content generated by manual input. One or more of these components and/or techniques may be used as part of a process for ML integration, resulting in more dynamic, efficient, and intuitive ML integration.

One or more techniques described hereby may facilitate the efficient integration of dynamic ML models, leading to useful and previously unknown relationships between data objects being identified. In these and other ways, components/techniques described here may identify methods to increase efficiency, decrease performance costs, decrease computational cost, and/or reduce resource requirements to integrate ML in an accurate, reactive, efficient, dynamic, and scalable manner, resulting in several technical effects and advantages over conventional computer technology, including increased capabilities and improved adaptability. In various embodiments, one or more of the aspects, techniques, and/or components described hereby may be implemented in a practical application via one or more computing devices, and thereby provide additional and useful functionality to the one or more computing devices, resulting in more capable, better functioning, and improved computing devices. For example, a practical application may include integrating ML with a CSP. Further, one or more of the aspects, techniques, and/or components described hereby may be utilized to improve the technical fields of ML, ML integration, CSPs, and/or content management.

In several embodiments, components described hereby may provide specific and particular manners to enable inferences to be made using ML models. In many embodiments, one or more of the components described hereby may be implemented as a set of rules that improve computer-related technology by allowing a function not previously performable by a computer that enables an improved technological result to be achieved. For example, the function allowed may include one or more of the specific and particular techniques disclosed hereby such as one or more of continuously sending new or modified content to applicable ML models; readily retraining or optimizing ML models with the most recent content; governing model versions in terms of active/inactive and target environments; enabling dynamic and automated model generation and utilization, such as by training new model iterations with production content; guiding users through the operation and configuration of various aspects of the ML integrator; allowing a bulk action to be run on lists of documents (e.g., from search, folder, collection) that asks one or more ML models for predictions; and auditing, logging, and making available the lifecycle, usage, and performance data of ML models.

With general reference to notations and nomenclature used hereby, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described hereby that form part of one or more embodiments. Rather, these operations are machine operations. Useful machines for performing operations of various embodiments include general purpose digital computers as selectively activated or configured by a computer program stored within that is written in accordance with the teachings hereby, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, whereby like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

Figure 1:
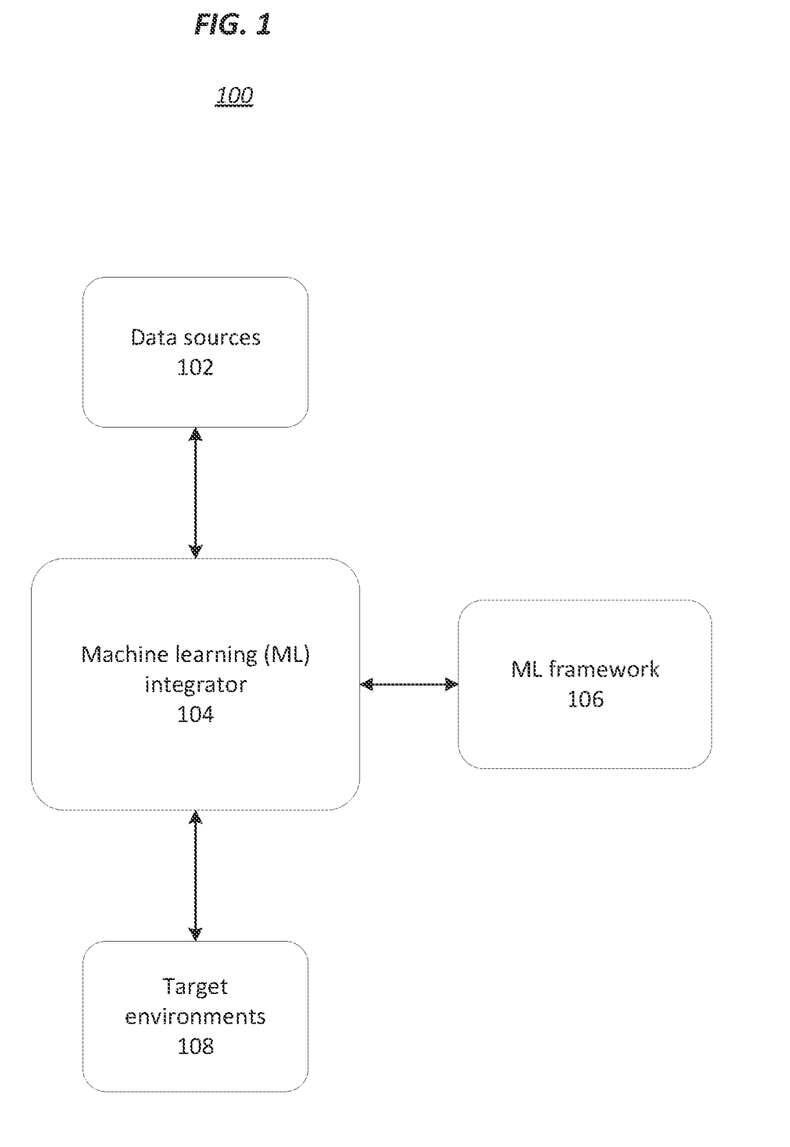
FIG. 1 illustrates an exemplary operating environment for a machine learning (ML) integrator according to one or more embodiments described hereby.

FIG. 1 illustrates an exemplary operating environment 100 for a machine learning (ML) integrator 104 according to one or more embodiments described hereby. Operating environment 100 may include ML integrator 104 in conjunction with one or more data sources 102, an ML framework 106, and one or more target environments. The ML integrator 104 may utilize ML framework 106 to generate ML models based on information from data sources 102. The ML integrator 104 may then make the ML models available for making inferences in the one or more target environments 108. In many embodiments, target environments 108 may include one or more portions of a computing platform, such as a content service platform. In various embodiments, the content service platform may include a variety of process and technologies that supports the collecting, transforming, managing, analyzing, and publishing of information (e.g., digital content). Accordingly, ML integrator 104 may operate to implement ML techniques in the collection, management, analysis, and/or publishing of content to gain valuable insights and efficiencies. For example, ML integrator 104 may enable ML models to be used in a target environment to suggest labels characterizing images of new products stored in a content repository. Embodiments are not limited in this context.

In various embodiments, the ML integrator 104 may obtain source data from the one or more data sources 102, produce training data and/or evaluation data for input into the ML framework 106 for generation of ML models. For example, ML integrator 104 may migrate, transform, and/or clean data from data sources 102 prior to providing it to ML framework 106 for training models. In some embodiments, ML integrator 104 may be utilized to select previously existing data for providing to ML framework 106. For example, the previously existing data may have been generated from prior migrating, transforming, and/or cleaning operations performed by the ML integrator. In another example, the previously existing data may include third-party training data. Further, the ML integrator may selective make ML models generated by ML framework 106 available in one or more of the target environments, such as based on labels and statuses applied to different models and model versions. As will be appreciated reference to training data or evaluation data herein may implicitly include corresponding evaluation data or training data as well as any other data needed as input by the ML framework 106.

In many embodiments, ML integrator 104 may integrate one or more of the data sources 102 with one or more of the target environments 108. For example, data sources 102 may include a production repository accessible via one or more of the target environments 108 (e.g., a content service platform). In such examples, the ML integrator 104 may utilize the production repository in the CSP as a data source 102. In many embodiments, utilizing the production repository as a data source 102 may enable models to be updated frequently and efficiently based on the most recent data. Further, one or more components of the ML integrator 104 and/or ML framework 106 may be integrated with one or more of the target environments 108.

In several embodiments, ML integrator 104 automates and/or provides guidance for various functionalities and techniques described hereby to reduce the need for manual and/or expert input in generating, integrating, and updating training data or ML models. In many embodiments, ML integrator 104 may track operation of various components of the ML integrator and/or components connected thereto. In some embodiments, ML 104 may generate a historical index of operational parameters and metrics of the components. In some such embodiments, the historical index may be used to identify, diagnose, repair issues. For example, the historical index may allow reversion to a prior stable configuration. In another example, configurations of select components may be restored to previous version at one or more points in time.

Figure 2:
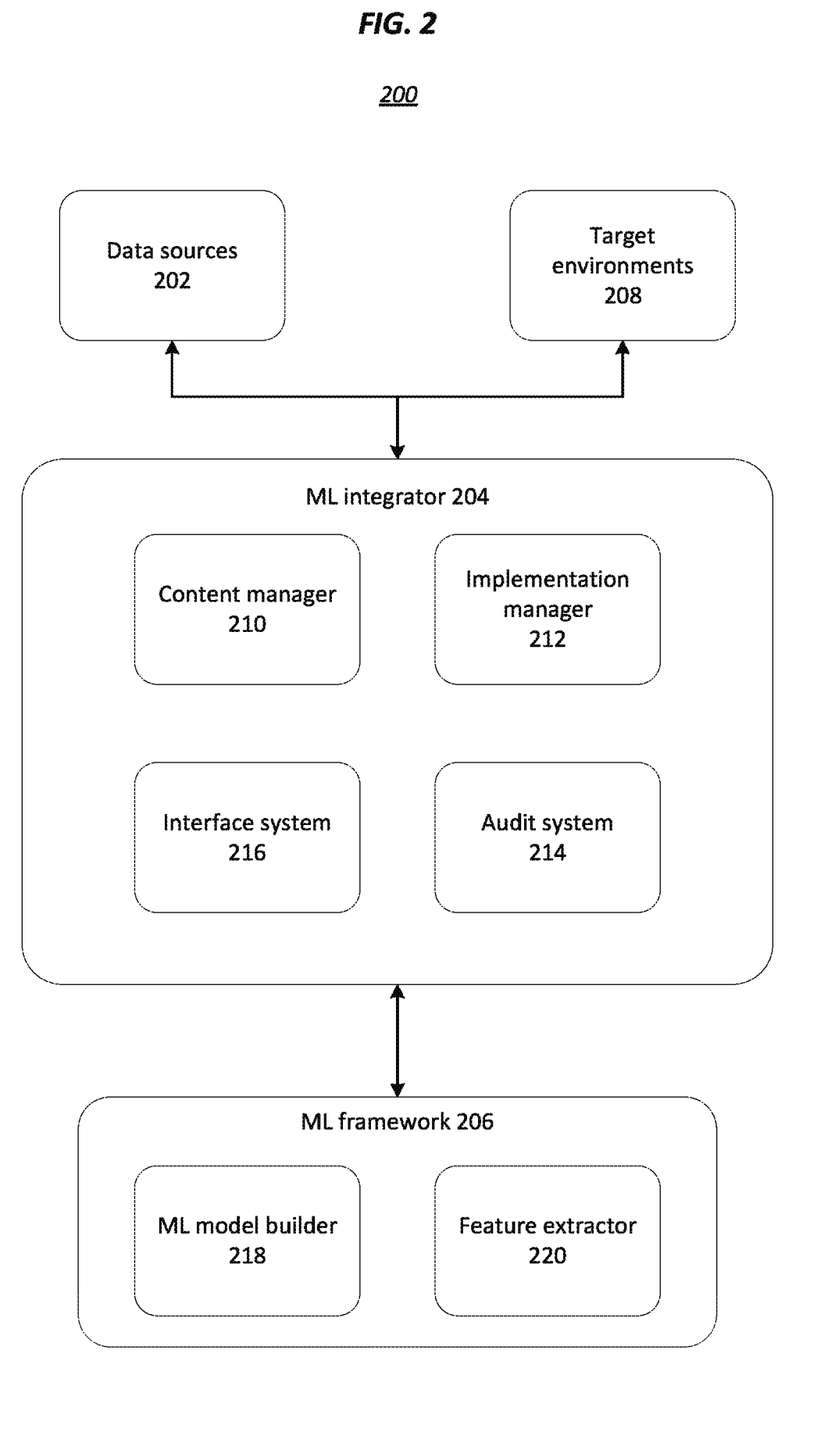
FIG. 2 illustrates exemplary aspects of an ML integrator according to one or more embodiments described hereby.

FIG. 2 illustrates exemplary aspects of an ML integrator 204 in environment 200 according to one or more embodiments described hereby. Environment 200 includes one or more data sources 202, one or more target environments 208, ML integrator 204, and an ML framework 206. In the illustrated embodiment, ML integrator includes content manager 210, implementation manager 212, interface system 216, and audit system 214, and ML framework 206 includes ML model builder 218 and feature extractor 220. In some embodiments, environment 200 may include one or more components that are the same or similar to one or more other components described hereby. For example, ML integrator 204 may be the same or similar to ML integrator 104. Embodiments are not limited in this context.

Generally, the content manager 210 may embody functionalities of the ML integrator associated with providing inputs to the ML framework 206, the implementation manager 212 may embody functionalities of the ML integrator 204 associated with making the outputs of the ML framework 206 available for making inferences via the one or more target environments 208, and the interface system 216 may embody functionalities of the ML integrator 204 associated with obtaining user input for determining which inferences to make. For example, the content manager 210 may produce training data to ML framework 206. In response, the ML framework may produce an ML model. The implementation manager 212 may utilize the ML model to make inferences available via an application programming interface (API), and the interface system 216 may provide a menu in a graphical user interface of the target environment.

In several embodiments, ML integrator 204 may utilize ML framework 206 to generate ML models based on information from data sources 202. For example, content manager 210 may utilize data from data sources 202 to produce training data for providing to ML model builder 218 and/or feature extractor 220 of ML framework 206. In many such examples, the data from data sources 202 includes production content that is accessible via the target environment. In many embodiments, models produced by the ML framework 206 be made available for making inferences in the one or more target environments 208. For example, implementation manager 212 may deploy and/or host one or more of the ML models to make them available for inferences in one or more of the target environments 208. In various embodiments, implementation manager 212 may integrate a production repository to where a corresponding model is deployed.

In various embodiments, features and functionalities of ML integrator 204 may be accessible via interface system 216. In many such embodiments, interface system 216 is accessible via, or integrated with, one or more of the target environments 208. More generally, one or more components of the ML integrator 204 may be integrated with one or more of the target environments 208. In several embodiments, one or more of the data sources 202 may be integrated with one or more of the target environments 208.

In many embodiments, the interface system 216 provide users with an intuitive experience that enable users to derive value from ML by providing a uniform and familiar interface. Further, clean interfaces with displayed functionalities being limited to those relevant to a current objective. In many embodiments, the interface system 216 may guide users through the operation and configuration of various aspects of the ML integrator 204, data sources 202, ML framework 206, and/or target environments 208 including analysis, interpretation, and/or resolution of associated data, issues, and results. Additional user interface and experience features may be relevant to aspects of the embodiments herein, as described in more detail in U.S. Patent Application, filed even date herewith, and titled "Techniques for Intuitive Machine Learning Development and Optimization," the entirety of which application is incorporated by reference herein.

In some embodiments, the interface system 216 may allow a bulk action to be run on lists of documents (e.g., from search, folder, collection in a target environment) that asks one or more ML models for predictions. In such examples, the results may be filled in depending on thresholds that are configurable via the interface system (e.g., confidence level thresholds). In yet another example, each time a form is accessed to create or edit content, suggestions for the new content may automatically be provided from model predictions. For example, interface system 216 may enable ML models to be used in a target environment to suggest labels characterizing images of a new fashion by season, color, photographer, talent. In another example, products captured in an image may be identified. The implementation manager 212 may perform the inference requested via the interface system 216. In some embodiments, click-to-add suggestions may be provided when an interface for entering or modifying data is presented. Accordingly, in many embodiments, the interface system 216 may determine to generate and provide inferences without explicit request. Additionally, the interface system 216 may allow control over one or more components or operational parameters of the data sources 202, ML integrator 204, ML framework 206, and/or target environments 208. In many embodiments, the interface system 216 may cause one or more GUIs, or portions of a GUI, to be presented, such as via target environments. In many such embodiments, user input is received while options, settings, metrics, and other output is presented via the GUIs or portions thereof. In one or more embodiments, interface system 216 may provide one or more interfaces independent of any target environments.

In several embodiments, the audit system 214 tracks operation of the ML integrator 204 and/or components connected thereto (e.g., data sources 202, ML framework 206, and target environments 208). For example, the lifecycle, usage, and performance data of a model can be audited, logged, and made available for analysis. Further, automatic actions from prediction may be backtracked to a previous state. In another example, information, such as visual indications, may be provided to distinguish content generated by ML modes from content generated by manual input. Many embodiments allow bulk predictions to be applied in a safe way that enables the scalability of AI to be tapped into without fear of costly mistakes.

Figure 3:
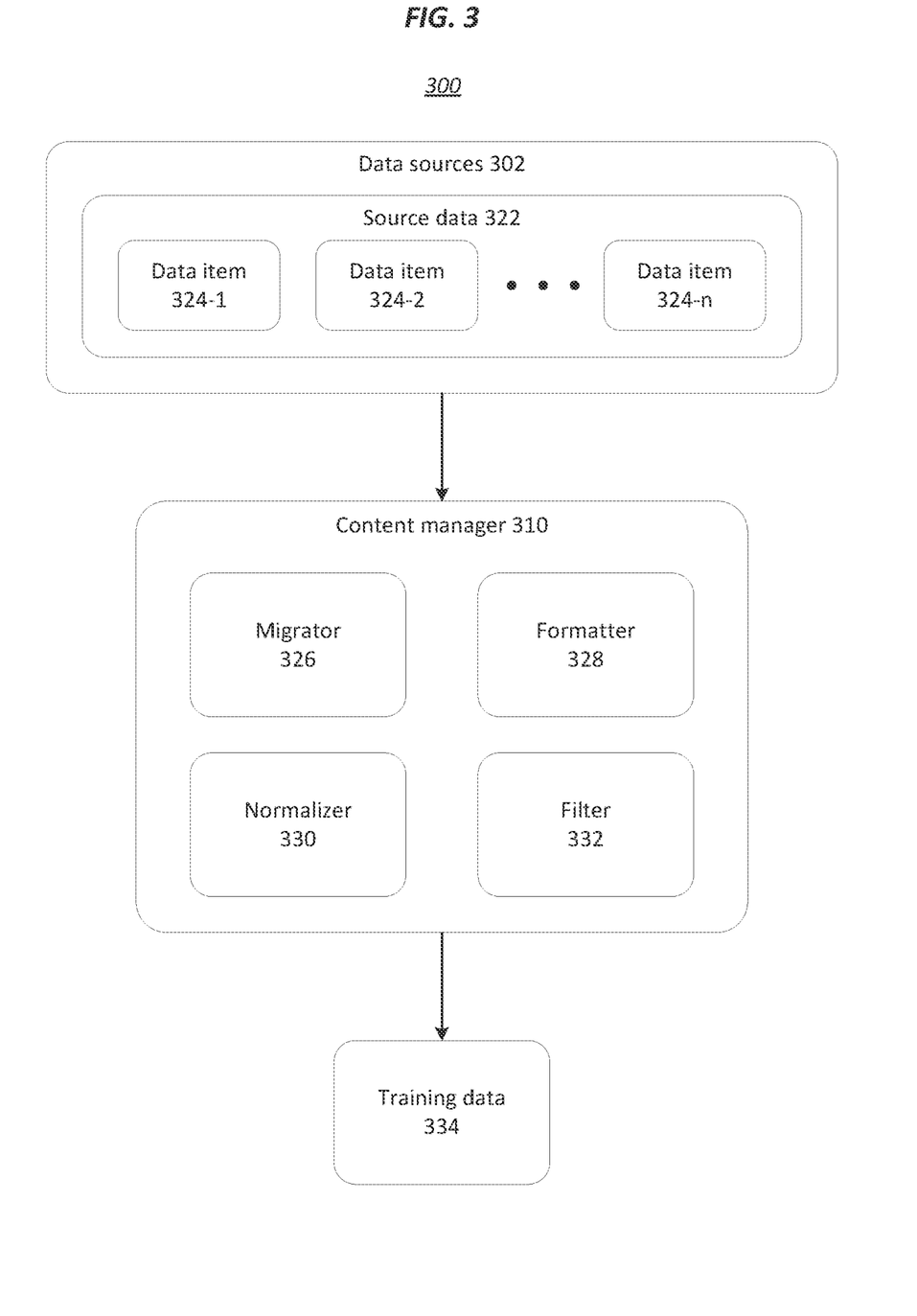
FIG. 3 illustrates exemplary aspects of a content manager according to one or more embodiments described hereby.

FIG. 3 illustrates exemplary aspects of a content manager 310 in environment 300 according to one or more embodiments described hereby. Environment 300 includes one or more data sources 302, content manager 310, and training data 334. In the illustrated embodiment, data sources 302 include source data 322 with data items 324-1, 324-2, 324-n (or data items 324), and content manager 310 includes migrator 326, formatter 328, normalizer 330, and filter 332. In various embodiments, the content manager 310 may generate training data 334 based on source data 322 obtained from data sources 302. In some embodiments, environment 300 may include one or more components that are the same or similar to one or more other components described hereby. For example, content manager 310 may be the same or similar to content manager 310. Embodiments are not limited in this context.

In various embodiments, content manager 310 may obtain source data 322 from data sources 302 and convert the source data 322 into training data 334 for providing to an ML framework. Migrator 326 may obtain the source data 322 via active or passive processes. For example, migrator 326 may periodically request source data 322 comprising new or modified data from one or more of the data sources 302. In another example, migrator 326 may receive source data 322 from one or more of the data sources 302 as a stream. In several embodiments, migrator 326 may obtain source data 322 comprising production content. Data items 324 may include data and/or metadata. In various embodiments, source data 322 is labeled (the labels comprising metadata). In other embodiments, source data 322 is unlabeled.

Formatter 328 may reformat the source data 322 based on requirements for ML techniques implemented by the ML framework. In several embodiments, formatter 328 handles converting data (e.g., content) into a rendition utilized by the ML framework. For example, formatter 328 may covert images to a target size or pixel count, such as a standard size for a data set. In another example, the resolution of an image may be changed to a target resolution. In yet another example, pixel RGB content format may be an array. In another example, formatter 328 may convert data item 324-1 from a first file type to a second file type (e.g., a document to an image). In some embodiments, items, such as binary text, may be extracted from data. In some such embodiments, binary text with punctuation may be extracted from a portable document format (PDF) data item.

Normalizer 330 may adjust values in the source data 322 that are measured on different scales to a notionally common scale. For example, a first data item with labels rating a data characteristic (e.g., pixel brightness, product durability, price, etc.) on a scale of 1-10 may be normalized with a second data item with labels rating the data characteristic on a scale of 1-5. Filter 332 may remove one or more data items 324 from source data 322. In several embodiments, filter 332 may remove one or more data items based on one or more data metrics associated with a ML framework (e.g., ML framework 206). For example, filter 332 may remove data items with an incompatible file format. In another example, filter 332 may remove data items failing a size or quality threshold.

In many embodiments, content manager 310 may continuously obtain new or modified content via the migrator 326, identify one or more corresponding ML models, and utilize the new or modified content to generate training data 334 with one or more of formatter 328, normalizer 330, and filter 332 to train, retrain, and/or optimize (e.g., hyperparameter training) the one or more corresponding ML models. In some embodiments, one or more operational parameters of the content manager 310, including components thereof, may be dynamically determined based on a corresponding or target ML model.

Figure 4:
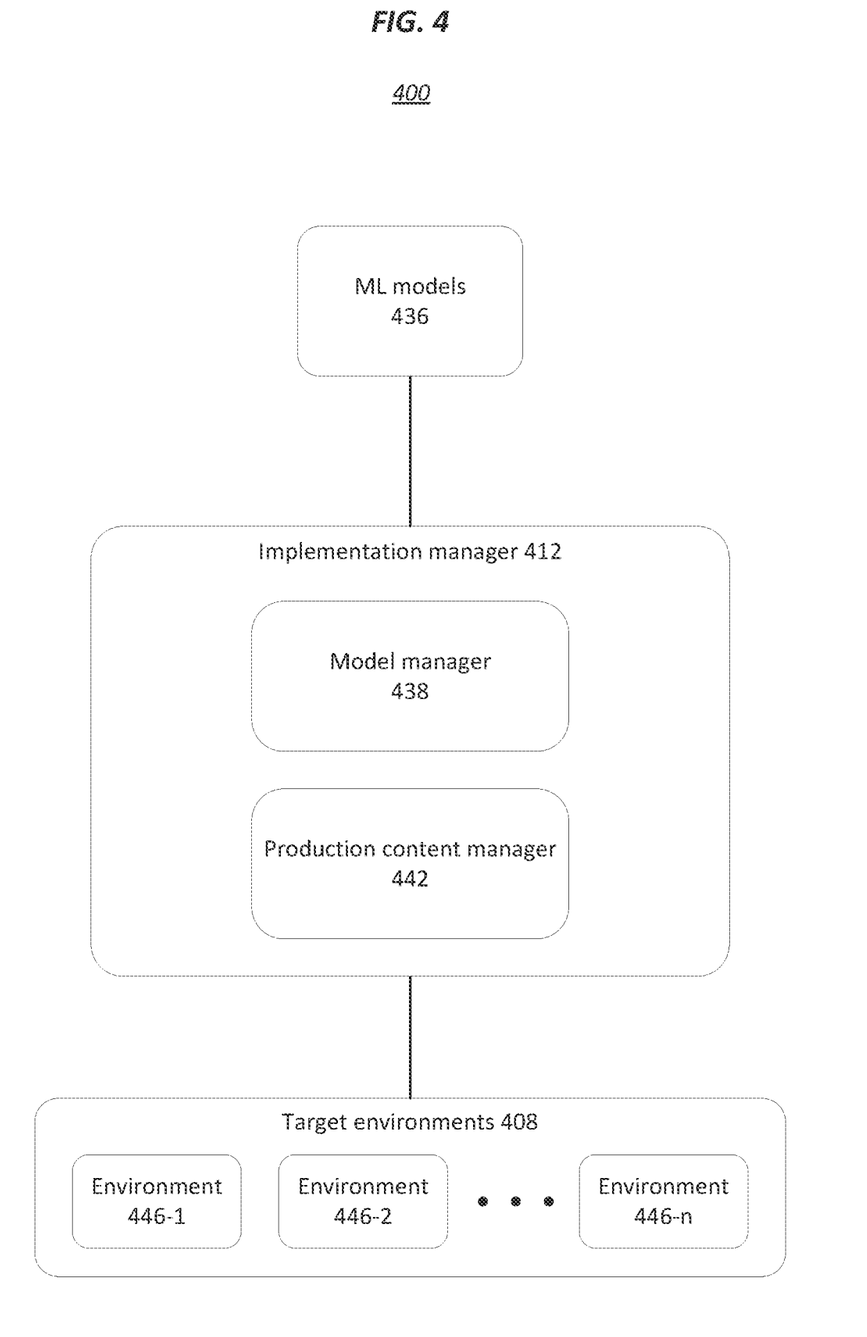
FIG. 4 illustrates exemplary aspects of an implementation manager according to one or more embodiments described hereby.

FIG. 4 illustrates exemplary aspects of an implementation manager 412 in environment 400 according to one or more embodiments described hereby. Environment 400 includes one or more ML models 436, implementation manager 412, and target environments 408. In the illustrated embodiment, implementation manager 412 includes model manager 438 and production content manager 442, and the one or more target environments 408 include environments 446-1, 446-2, 446-n (or environments 446). In various embodiments, the implementation manager 412 may selectively utilize the one or more ML models 436 to make inference services available to select ones of the target environments 408. In some embodiments, environment 400 may include one or more components that are the same or similar to one or more other components described hereby. For example, implementation manager 412 may be the same or similar to implementation manager 212. Embodiments are not limited in this context.

In various embodiments, the model manager 438 may provide one or more of custodial, administrative, deployment, hosting, and inference functionalities to select environments 446 of target environments 408. For example, model manager 438 may provide a model repository that includes metadata for tracking characteristics of the models, such as statuses of (active/inactive), correlations between, performance statistics, version, instances, deployment history, and the like. Model manager 438 may allow models to be published with labels, being active and available to the corresponding environment instances. Further, model manager 438 may deploy a new model for use via a target environment (e.g., an external infrastructure), such as for use by a content repository. In some embodiments, a model may be deployed based on a status setting (e.g., active/inactive) corresponding to the model version. In various embodiments, deploying a model may include deploying a docker image with a tensor flow serve service with the model (e.g., in a zip file) inside. In several embodiments, model manager 438 may automatically orchestrate deploying models and/or configuring the model for deployment, such as on a CSP.

In many embodiments, the production content manager 442 may integrate a production repository to where a corresponding model is deployed. In various embodiments, integration may include registering/configuring a model on a production instance so that the instance is aware of the model and queries the model. For example, integration may include one or more of routing queries to the appropriate endpoint (e.g., correct model version) where the model is deployed, consolidating query results, and sending the resulting predictions to the instance.

In some embodiments, the production content manager 442 may provide security to the production repository, such as by anonymizing or encrypting content. In many embodiments, communication utilizes secure APIs. For example, APIs may be authenticated with and/or utilize hypertext transfer protocol secure (HTTPS).

Figure 5:
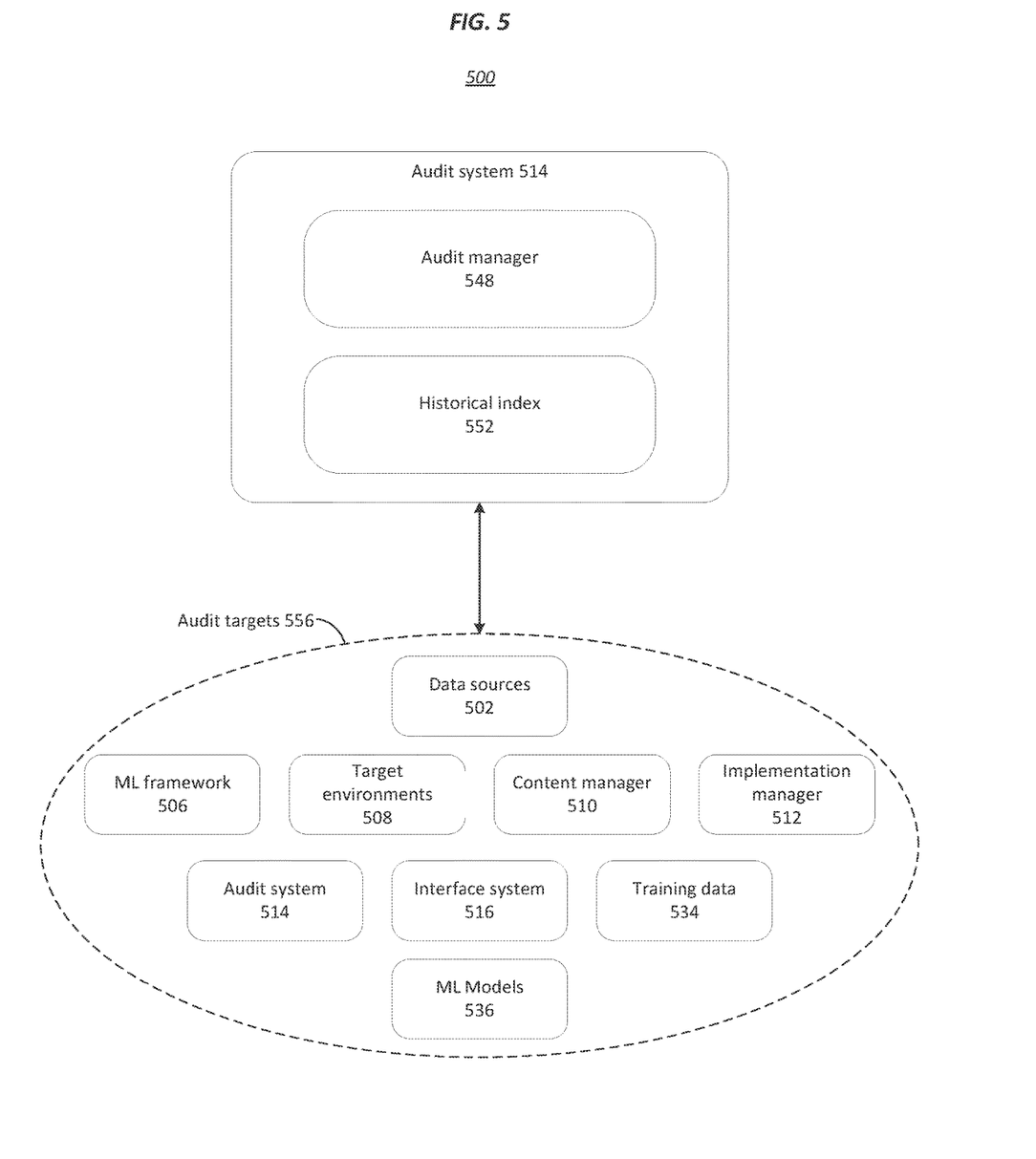
FIG. 5 illustrates exemplary aspects of an audit system according to one or more embodiments described hereby.

FIG. 5 illustrates exemplary aspects of an audit system 514 in environment 500 according to one or more embodiments described hereby. Environment 500 includes audit system 514 and one or more audit targets 556. In the illustrated embodiment, the audit system 514 includes audit manager 548 and historical index 552, and the audit targets 556 include data sources 502, ML framework 506, target environments 508, content manager 510, implementation manager 512, audit system 514, interface system 516, training data 534, and ML models 536. In various embodiments, audit system 514 may monitor and track operation of one or more of the audit targets 556. In many such embodiments, the audit targets 556 may include various components of the ML integrator and/or components connected thereto. In some embodiments, environment 500 may include one or more components that are the same or similar to one or more other components described hereby. For example, audit system 514 may be the same or similar to audit system 214. Embodiments are not limited in this context.

In various embodiments, the audit manager 548 may monitor and log activities of the audit targets. In various such embodiments, the audit manager 548 may generate historical index 552 based on the activities monitored and logged. In some embodiments, the historical index 552 may include a timeline of system states, component configurations, and/or performance metrics. In several embodiments, the audit manager 518 may enable interfacing with and restoring from the historical index. For example, audit manager 548 may enable a user to revert to a previous configuration of a component having issues. In some embodiments, audit manager 548 may provide guidance on identifying, diagnosing, and/or repairing issues. For example, the historical index 552 may allow reversion to a prior stable configuration. In another example, configurations of select components may be restored to previous version at one or more points in time.

In several embodiments, the audit manager 548 may implement one or more diagnostic procedures or measurements and record the results in the historical index 552. In several such embodiments, the results may be utilized in identifying, diagnosing, and/or repairing issues, as well as providing guidance through the identifying, diagnosing, and/or repairing. Oftentimes, the audit system 514 is responsible for auditing and logging the lifecycle and usage of ML models and/or training data. various components. In some embodiments, audit system 514 may cause indications of whether data was generated by human or ML model to be provided. In some such embodiments, the indications may be provided to the interface system for presentation.

Figure 6:
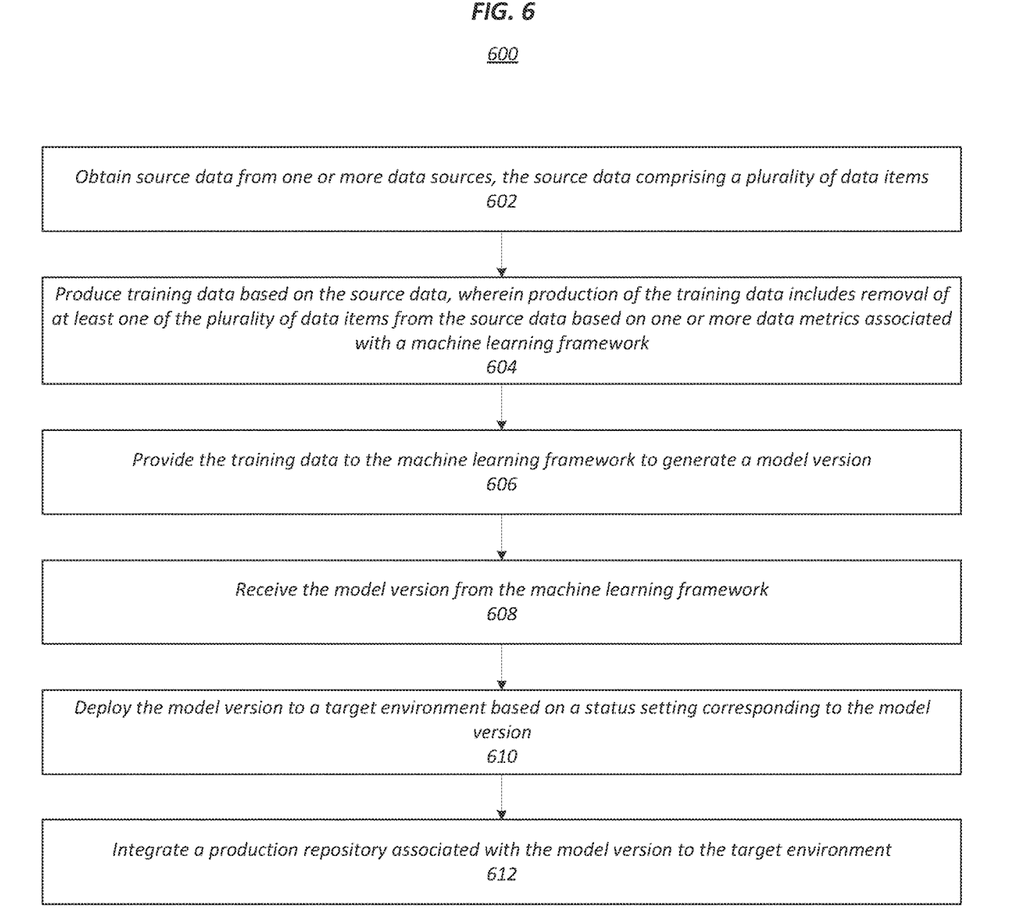
FIG. 6 illustrates an exemplary logic flow according to one or more embodiments described here.

FIG. 6 illustrates a logic flow 600, in accordance with non-limiting example(s) of the present disclosure. Logic flow 600 can begin at block 602. At block 602 "obtain source data from one or more data sources, the source data comprising a plurality of data items" source data comprising a plurality of data items may be obtained from one or more data sources. For example, content manager 310 may obtain source data 322 comprising data items 324 from data sources 302.

Continuing to block 604 "produce training data based on the source data, wherein production of the training data includes removal of at least one of the plurality of data items from the source data based on one or more data metrics associated with a machine learning framework. For example, filter 332 may remove one or more of data items 324 from source data 322 during production of training data 334 based on data metrics associated with ML framework 206.

Continuing to block 606 "provide the training data to the machine learning framework to generate a model version" training data may be provided to the ML framework for generation of a model version. For instance, training data 334 may be provided to ML framework 206 for generation of one of ML models 436. At block 608 "receive the model version from the machine learning framework" the model version may be received from the ML framework after generation. For example, implementation manager 412 may receive the model version from ML framework 106.

Continuing to block 610 "deploy the model version to a target environment based on a status setting corresponding to the model version" the model version may be deployed to a target environment based on corresponding status settings. For example, model manager 438 may deploy one of ML models 436 to one or more of target environments 408 based on a status setting associated with the one of ML models 436. At block 612 "integrate a production repository associated with the model version to the target environment" a production repository associated with the model version may be integrated with the target environment. For example, production content manager 442 may integrate a production repository to environment 446-1 based on an associated model version being deployed to environment 446-1.

Figure 7:
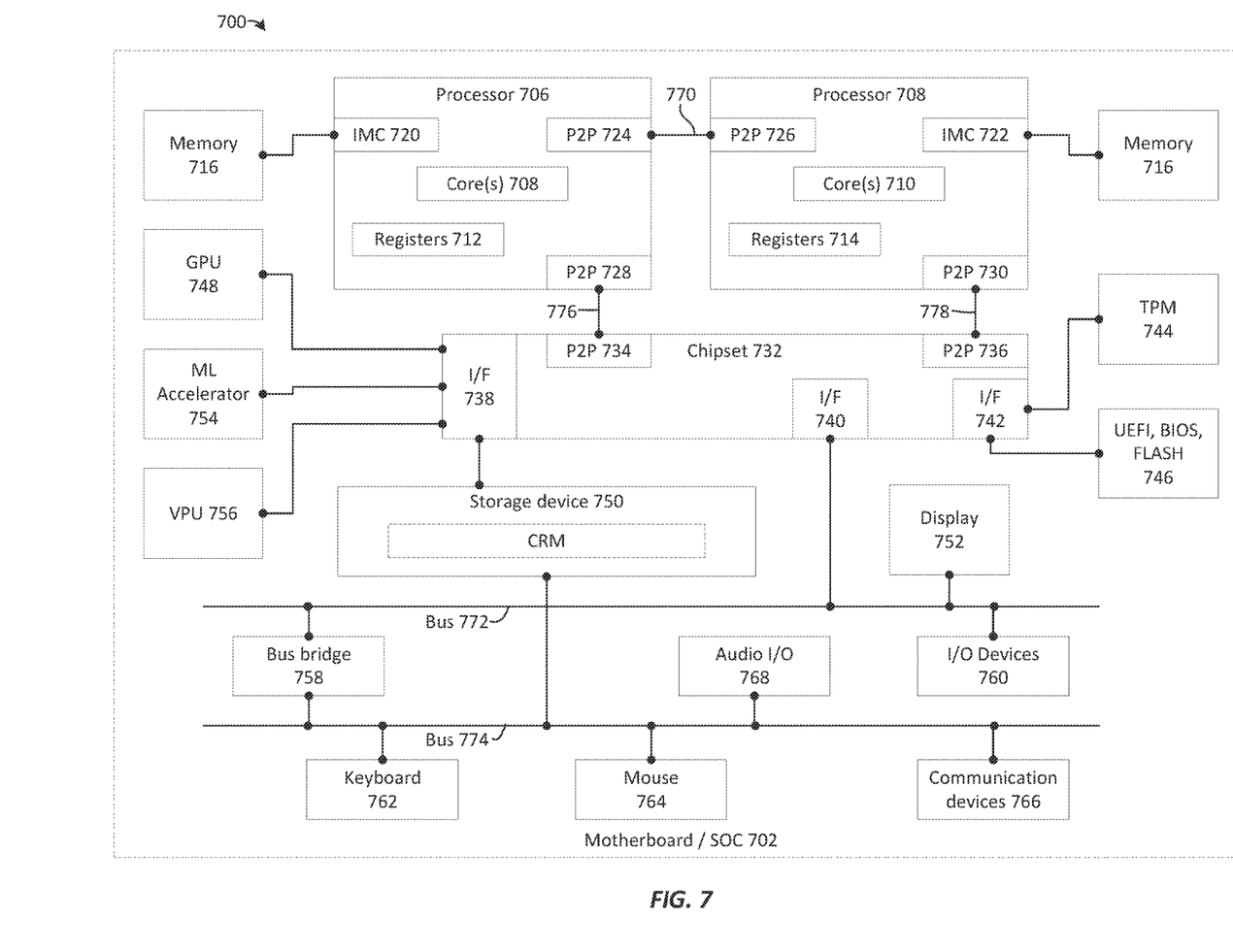
FIG. 7 illustrates exemplary aspects of a computing system according to one or more embodiments described hereby.

FIG. 7 illustrates an embodiment of a system 700 that may be suitable for implementing various embodiments described hereby. System 700 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 700 may have a single processor with one core or more than one processor. Note that the term "processor" refers to a processor with a single core or a processor package with multiple processor cores. In at least one embodiment, the computing system 700 is representative of one or more components described hereby, such as ML integrator 204, content manager 310, implementation manager 412, or audit system 514. More generally, the computing system 700 is configured to implement all logic, systems, logic flows, methods, apparatuses, and functionality described hereby with reference to FIGS. 1-6. The embodiments are not limited in this context.

As used in this application, the terms "system" and "component" and "module" are intended to refer to a computer-related entity, either hardware, a combination of hardware and software, software, or software in execution, examples of which are provided by the exemplary system 700. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 700 comprises a motherboard or system-on-chip (SoC) 702 for mounting platform components. Motherboard or system-on-chip (SoC) 702 is a point-to-point (P2P) interconnect platform that includes a first processor 704 and a second processor 706 coupled via a point-to-point interconnect 770 such as an Ultra Path Interconnect (UPI). In other embodiments, the system 700 may be of another bus architecture, such as a multi-drop bus. Furthermore, each of processor 704 and processor 706 may be processor packages with multiple processor cores including core(s) 708 and core(s) 710, respectively. While the system 700 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 704 and chipset 732. Some platforms may include additional components and some platforms may only include sockets to mount the processors and/or the chipset. Furthermore, some platforms may not have sockets (e.g. SoC, or the like).

The processor 704 and processor 706 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 704 and/or processor 706. Additionally, the processor 704 need not be identical to processor 706.

Processor 704 includes an integrated memory controller (IMC) 720 and point-to-point (P2P) interface 724 and P2P interface 728. Similarly, the processor 706 includes an IMC 722 as well as P2P interface 726 and P2P interface 730. IMC 720 and IMC 722 couple the processors processor 704 and processor 706, respectively, to respective memories (e.g., memory 716 and memory 718). Memory 716 and memory 718 may be portions of the main memory (e.g., a dynamic random-access memory (DRAM)) for the platform such as double data rate type 3 (DDR3) or type 4 (DDR4) synchronous DRAM (SDRAM). In the present embodiment, the memory 716 and memory 718 locally attach to the respective processors (i.e., processor 704 and processor 706). In other embodiments, the main memory may couple with the processors via a bus and shared memory hub.

System 700 includes chipset 732 coupled to processor 704 and processor 706. Furthermore, chipset 732 can be coupled to storage device 750, for example, via an interface (I/F) 738. The I/F 738 may be, for example, a Peripheral Component Interconnect-enhanced (PCI-e). Storage device 750 can store instructions executable by circuitry of system 700 (e.g., processor 704, processor 706, GPU 748, ML accelerator 754, vision processing unit 756, or the like). For example, storage device 750 can store instructions for ML integrator 204, content manager 310, implementation manager 412, audit system 514, logic flow 600, or the like.

Processor 704 couples to a chipset 732 via P2P interface 728 and P2P 734 while processor 706 couples to a chipset 732 via P2P interface 730 and P2P 736. Direct media interface (DMI) 776 and DMI 778 may couple the P2P interface 728 and the P2P 734 and the P2P interface 730 and P2P 736, respectively. DMI 776 and DMI 778 may be a high-speed interconnect that facilitates, e.g., eight Giga Transfers per second (GT/s) such as DMI 3.0. In other embodiments, the processor 704 and processor 706 may interconnect via a bus.

The chipset 732 may comprise a controller hub such as a platform controller hub (PCH). The chipset 732 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 732 may comprise more than one controller hub such as a chipset with a memory controller hub, a graphics controller hub, and an input/output (I/O) controller hub.

In the depicted example, chipset 732 couples with a trusted platform module (TPM) 744 and UEFI, BIOS, FLASH circuitry 746 via I/F 742. The TPM 744 is a dedicated microcontroller designed to secure hardware by integrating cryptographic keys into devices. The UEFI, BIOS, FLASH circuitry 746 may provide pre-boot code.

Furthermore, chipset 732 includes the I/F 738 to couple chipset 732 with a high-performance graphics engine, such as, graphics processing circuitry or a graphics processing unit (GPU) 748. In other embodiments, the system 700 may include a flexible display interface (FDI) (not shown) between the processor 704 and/or the processor 706 and the chipset 732. The FDI interconnects a graphics processor core in one or more of processor 704 and/or processor 706 with the chipset 732.

Additionally, ML accelerator 754 and/or vision processing unit 756 can be coupled to chipset 732 via I/F 738. ML accelerator 754 can be circuitry arranged to execute ML related operations (e.g., training, inference, etc.) for ML models. Likewise, vision processing unit 756 can be circuitry arranged to execute vision processing specific or related operations. In particular, ML accelerator 754 and/or vision processing unit 756 can be arranged to execute mathematical operations and/or operands useful for machine learning, neural network processing, artificial intelligence, vision processing, etc.

Various I/O devices 760 and display 752 couple to the bus 772, along with a bus bridge 758 which couples the bus 772 to a second bus 774 and an I/F 740 that connects the bus 772 with the chipset 732. In one embodiment, the second bus 774 may be a low pin count (LPC) bus. Various devices may couple to the second bus 774 including, for example, a keyboard 762, a mouse 764 and communication devices 766.

Furthermore, an audio I/O 768 may couple to second bus 774. Many of the I/O devices 760 and communication devices 766 may reside on the motherboard or system-on-chip (SoC) 702 while the keyboard 762 and the mouse 764 may be add-on peripherals. In other embodiments, some or all the I/O devices 760 and communication devices 766 are add-on peripherals and do not reside on the motherboard or system-on-chip (SoC) 702.

Figure 8:
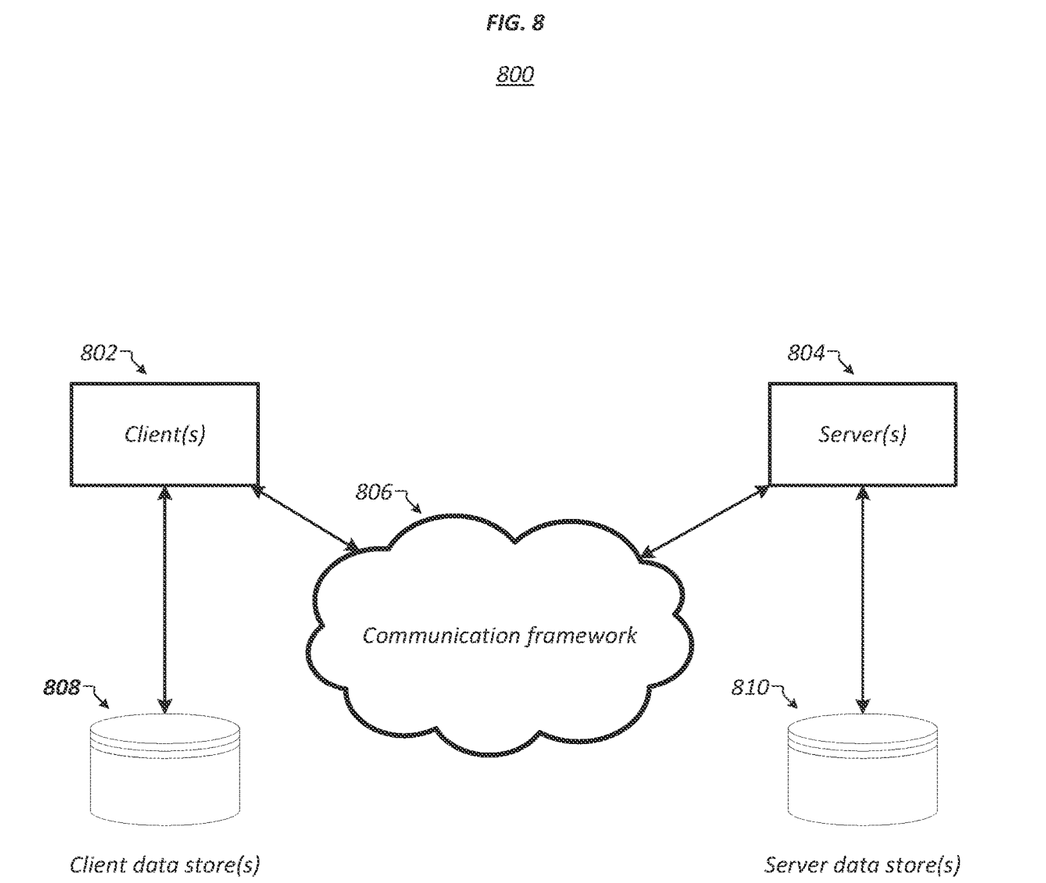
FIG. 8 illustrates exemplary aspects of a communications architecture according to one or more embodiments described hereby.

FIG. 8 illustrates a block diagram of an exemplary communications architecture 800 suitable for implementing various embodiments as previously described, such as communications between ML integrator 104 and data sources 102, ML framework 106, and/or target environments 108. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. In some embodiments, communications architecture may include or implement one or more portions of components, applications, and/or techniques described hereby. The clients 802 and the servers 804 are operatively connected to one or more respective client data stores 808 and server data stores 810 that can be employed to store information local to the respective clients 802 and servers 804, such as cookies and/or associated contextual information. In various embodiments, any one of servers 804 may implement one or more of logic flows or operations described hereby, such as in conjunction with storage of data received from any one of clients 802 on any of server data stores 810. In one or more embodiments, one or more of client data store(s) 808 or server data store(s) 810 may include memory accessible to one or more portions of components, applications, and/or techniques described hereby.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated hereby.

The invention claimed is:

1. An apparatus, the apparatus comprising:
a processor; and
a memory comprising instructions that when executed by the processor cause the processor to:
  obtain source data from one or more data sources, the source data comprising a plurality of data items;
  produce training data based on the source data, wherein production of the training data includes removal of at least one of the plurality of data items from the source data based on one or more data metrics associated with a machine learning framework;
  provide the training data to the machine learning framework to generate a model version;
  receive the model version from the machine learning framework;
  deploy a docker image, with the model version, based on a status setting corresponding to the model version;
  deploy the docker image to a target environment to deploy the model version to the target environment;
  register the model version with an instance of a production repository to associate the model version to the target environment;
  generate a log of activity associated with the training data via an audit system that provides indications to distinguish content of machine language models from manual input, wherein the log of activity is associated with deploying the model version to the target environment based on the status setting corresponding to the model version, and with integrating the production repository associated with the model version to the target environment; and
  restore the target environment and the one or more data sources to a previous state based on the log of activity and a historical index.

2. The apparatus of claim 1, wherein the target environment includes a content services platform.

3. The apparatus of claim 2, wherein the target environment includes a content repository of the content services platform.

4. The apparatus of claim 1, the memory comprising instructions that when executed by the processor cause the processor to generate the log of activity associated with one or more of:
  obtaining the source data from the one or more data sources,
  producing the training data based on the source data,
  providing the training data to the machine learning framework, and
  receiving the model version from the machine learning framework.

5. The apparatus of claim 1, wherein each data item includes data and metadata corresponding to the data.

6. The apparatus of claim 1, wherein production of the training data includes transformation of at least one of the plurality of data items in the source data from a format incompatible with the machine learning framework into a format compatible with the machine learning framework.

7. The apparatus of claim 1, wherein the data metric comprises one or more of a file type, a file size threshold, a quality threshold, and a reliability indicator.

8. The apparatus of claim 1, wherein production of the training data includes normalizing the source data.

9. The apparatus of claim 1, wherein the log of activity associated with the training data via the audit system enables actions from a prediction to be backtracked to the previous state.

10. At least one non-transitory computer-readable medium comprising a set of instructions that, in response to being executed by a processor circuit, cause the processor circuit to:
  obtain source data from one or more data sources, the source data comprising a plurality of data items;
  produce training data based on the source data, wherein production of the training data includes removal of at least one of the plurality of data items from the source data based on one or more data metrics associated with a machine learning framework;
  provide the training data to the machine learning framework to generate a model version;
  receive the model version from the machine learning framework;
  deploy a docker image, with the model version, based on a status setting corresponding to the model version;
  deploy the docker image to a target environment to deploy the model version to the target environment;
  register the model version with an instance of a production repository to associate the model version to the target environment;
  generate a log of activity associated with the training data that provides indications to distinguish content of machine language modes from manual input; wherein the log of activity is associated with deploying the model version to the target environment based on the status setting corresponding to the model version, and with integrating the production repository associated with the model version to the target environment; and
  restore the target environment and the one or more data sources to a previous state based on the log of activity and a historical index.

11. The at least one non-transitory computer-readable medium of claim 10, wherein the target environment includes a content services platform.

12. The at least one non-transitory computer-readable medium of claim 11, wherein the target environment includes a content repository of the content services platform.

13. The at least one non-transitory computer-readable medium of claim 10, comprising instructions that, in response to being executed by the processor circuit cause the processor circuit to generate the log of activity associated with one or more of obtaining the source data from the one or more data sources, producing the training data based on the source data, providing the training data to the machine learning framework, receiving the model version from the machine learning framework, deploying the model version to the target environment based on the status setting corresponding to the model version, and integrating the production repository associated with the model version to the target environment.

14. The at least one non-transitory computer-readable medium of claim 10, wherein each data item includes data and metadata corresponding to the data.

15. The at least one non-transitory computer-readable medium of claim 10, wherein production of the training data includes transformation of at least one of the plurality of data items in the source data from a format incompatible with the machine learning framework into a format compatible with the machine learning framework.

16. The at least one non-transitory computer-readable medium of claim 10, wherein the log of activity associated with the training data enables actions from a prediction to be backtracked to the previous state.

17. A computer-implemented method, comprising:
obtaining source data from one or more data sources, the source data comprising a plurality of data items;
producing training data based on the source data, wherein production of the training data includes removal of at least one of the plurality of data items from the source data based on one or more data metrics associated with a machine learning framework;
providing the training data to the machine learning framework to generate a model version;
receiving the model version from the machine learning framework;
deploying a docker image, with the model version, based on a status setting corresponding to the model version;
deploying the docker image to a target environment to deploy the model version to the target environment;
registering the model version with an instance of a production repository to associate the model version to the target environment;
generate a log of activity associated with the training data that provides indications to distinguish content of machine language modes from manual input, wherein the log of activity is associated with deploying the model version to the target environment based on the status setting corresponding to the model version, and with integrating the production repository associated with the model version to the target environment; and
restoring the target environment and the one or more data sources to a previous state based on the log of activity and a historical index.

18. The computer-implemented method of claim 17, comprising generating the log of activity associated with one or more of obtaining the source data from the one or more data sources, producing the training data based on the source data, providing the training data to the machine learning framework, receiving the model version from the machine learning framework, deploying the model version to the target environment based on the status setting corresponding to the model version, and integrating the production repository associated with the model version to the target environment.

19. The computer-implemented method of claim 17, wherein production of the training data includes transforming at least one of the plurality of data items in the source data from a format incompatible with the machine learning framework into a format compatible with the machine learning framework.

20. The computer-implemented method of claim 17, wherein the log of activity associated with the training data enables actions from a prediction to be backtracked to the previous state.

* * * * *